United States Patent [19]
Dault et al.

[11] Patent Number: 5,675,220
[45] Date of Patent: Oct. 7, 1997

[54] POWER SUPPLY FOR VEHICULAR NEON LIGHT

[75] Inventors: Robert Dault, Ferrysburg; Richard T. Young, Lowell; Richard O. Juengel, Romeo, all of Mich.

[73] Assignee: ADAC Plastics, Inc., Grand Rapids, Mich.

[21] Appl. No.: 503,178

[22] Filed: Jul. 17, 1995

[51] Int. Cl.$^6$ ...................................................... B60Q 1/26
[52] U.S. Cl. ................................. 315/77; 315/78; 315/85; 315/94; 315/101; 315/209 T
[58] Field of Search ..................................... 315/77, 78, 82, 315/85, 94, 98, 101, 209 R, 171, 209 T

[56] References Cited

U.S. PATENT DOCUMENTS

| | | | |
|---|---|---|---|
| 2,170,600 | 8/1939 | Voll | 240/8.1 |
| 2,266,578 | 12/1941 | Wheldon et al. | 175/264 |
| 3,271,620 | 9/1966 | Webb | 315/160 |
| 3,297,910 | 1/1967 | Gershen | 315/155 |
| 3,365,648 | 1/1968 | Benjamin | 321/10 |
| 3,922,584 | 11/1975 | Strowe | 315/171 |
| 4,365,186 | 12/1982 | Gerry | 315/209 R |
| 4,502,454 | 3/1985 | Hamai et al. | 123/597 |
| 4,645,974 | 2/1987 | Asai | 315/50 |
| 4,667,132 | 5/1987 | Leale | 315/282 |
| 4,682,146 | 7/1987 | Friedman, III | 340/77 |
| 4,868,458 | 9/1989 | Davenport et al. | 315/77 |
| 4,937,497 | 6/1990 | Osawa et al. | 315/77 |
| 4,939,421 | 7/1990 | Sagers et al. | 315/85 |
| 4,968,917 | 11/1990 | Harris | 315/77 |
| 5,004,953 | 4/1991 | McDonald | 315/86 |
| 5,041,767 | 8/1991 | Doroftei et al. | 315/292 |
| 5,059,865 | 10/1991 | Bergman et al. | 315/82 |
| 5,089,754 | 2/1992 | George | 315/386 |
| 5,095,251 | 3/1992 | Cheng | 315/171 |
| 5,150,961 | 9/1992 | Gonzalez | 362/83.2 |
| 5,154,505 | 10/1992 | Sasamoto | 362/80 |
| 5,154,507 | 10/1992 | Collins | 362/218 |
| 5,192,125 | 3/1993 | Gonzalez | 362/83.2 |
| 5,241,242 | 8/1993 | Daub | 315/82 |
| 5,255,166 | 10/1993 | Gonzalez | 362/83.2 |
| 5,422,548 | 6/1995 | Yamashita et al. | 315/77 X |

FOREIGN PATENT DOCUMENTS

WO9211742  7/1992  WIPO.

OTHER PUBLICATIONS

Sylvania Automotive and Miniature Lighting Catalog "Neon Discharge Technology".

*Primary Examiner*—Robert Pascal
*Assistant Examiner*—Haissa Philogene
*Attorney, Agent, or Firm*—Young & Basile, P.C.

[57] ABSTRACT

A circuit for use in providing high voltage power to a neon bulb positioned on the vehicle utilizing the vehicle DC battery as the power source. The circuit includes an invertor, a transformer, and a rectifier. The invertor receives low voltage DC from the vehicle battery, converts the low voltage DC to a low voltage AC drive voltage, and delivers the AC drive voltage to the transformer primary for conversion to a high voltage AC at the transformer secondary. The rectifier receives the high voltage AC from the transformer secondary, converts the high voltage AC to high voltage DC, and delivers the high voltage DC to the neon bulb. Since the power delivered to the neon tube is DC there is less need to shield the tube with respect to electro magnetic emissions and parasitic losses in the wire runs between the battery and the neon tube are significantly reduced.

12 Claims, 2 Drawing Sheets

POWER SUPPLY FOR VEHICULAR NEON LIGHT

This invention relates to vehicular lighting and more particularly to vehicular neon lighting.

Neon lights are attractive for vehicular application since they reach full illumination substantially quicker than incandescent lights. For example, at 70° F. an incandescent light such as a stop light may take about one fifth of a second (200 milliseconds) to reach full illumination and a car going 60 mph travels about 18 feet during this interval. By contrast, a neon light reaches full illumination in about one five thousandths of a second (0.2 milliseconds) during which time the car going 60 mph travels only 0.02 feet (less than ¼ inch). Further, neon lighting is attractive from a styling standpoint because it provides a great deal of styling latitude.

However, the use of neon lights on vehicles creates RF interference including both line noise in the vehicle, which can disable or create malfunctions in electric systems such as automatic braking and vehicle fuel pumps, and radiated RF noise which requires some sort of shielding. Specifically, the electro magnetic interference (EMI) requirements dictate that the neon tube be shielded to prevent radiation while still allowing the light to be seen, thereby creating a difficult and expensive packaging problem. Also, parasitic losses from long wire runs at high voltage and high frequency contribute to low efficiency of the circuit for a given light output intensity.

SUMMARY OF THE INVENTION

This invention is directed to the provision of improved lighting for a motor vehicle.

More specifically, this invention is directed to the provision of a plasma discharge light source on a vehicle without interfering with the operation of other electronic components on the vehicle.

Yet more specifically, this invention is directed to the provision of an improved neon lighting system for a vehicle.

The invention is applicable to a motor vehicle of the type including a DC battery and utilizes the DC battery as the power source for a plasma discharge light source positioned on the vehicle.

According to the invention, circuit means are provided which are operative to receive a low voltage DC from the battery, convert the low voltage DC to a high voltage DC, and deliver the high voltage DC to the plasma discharge light source. With this arrangement there is much less need to shield the plasma discharge light source but rather the shielding need only be applied primarily to the circuit means which may be provided in a relatively small convertor package.

According to a further feature of the invention, the circuit means includes a step up transformer having a low voltage primary and a high voltage secondary; invertor means receiving low voltage DC from the battery, converting the low voltage DC to a low voltage AC drive voltage, and delivering the AC drive voltage to a transformer primary for conversion to a high voltage AC at the transformer secondary; and rectifier means receiving the high voltage AC from the transformer secondary, converting the high voltage AC to high voltage DC, and delivering the high voltage DC to the plasma discharge light source. This specific circuit means allows the circuit means to be readily packaged into a small unit which may be conveniently located on the motor vehicle and which may be conveniently shielded.

In the disclosed embodiment of the invention, the plasma discharge light source comprises a neon bulb and the neon bulb comprises the light source for a center high mount stop light (CHMSL) provided at the rear of the vehicle.

The invention also provides a method of providing power to a plasma discharged light source positioned on a vehicle utilizing the vehicle DC battery as the power source. According to the invention methodology, low voltage DC is received from the battery; the low voltage DC is converted to a high voltage AC; and the high voltage AC is delivered to the plasma discharge light source. In the disclosed embodiment of the invention methodology, the low voltage DC from the battery is delivered to an invertor; the low voltage DC is converted at the invertor to a low voltage AC; the low voltage AC from the invertor is delivered to the primary of the transformer; the low voltage AC at the transformer primary is converted to a high voltage AC at the transformer secondary; the high voltage AC from the transformer secondary is delivered to a rectifier; the high voltage AC at the rectifier is converted to a high voltage DC; and the high voltage DC from the rectifier is delivered to the plasma discharge light source. This methodology allows the use of a plasma discharge light source on the vehicle, such for example as a neon bulb, while allowing for the ready shielding of electro magnetic emissions from the power supply for the plasma discharge light source.

DETAILED DESCRIPTION OF THE PREFERRED EMBODIMENT

Figure 1:
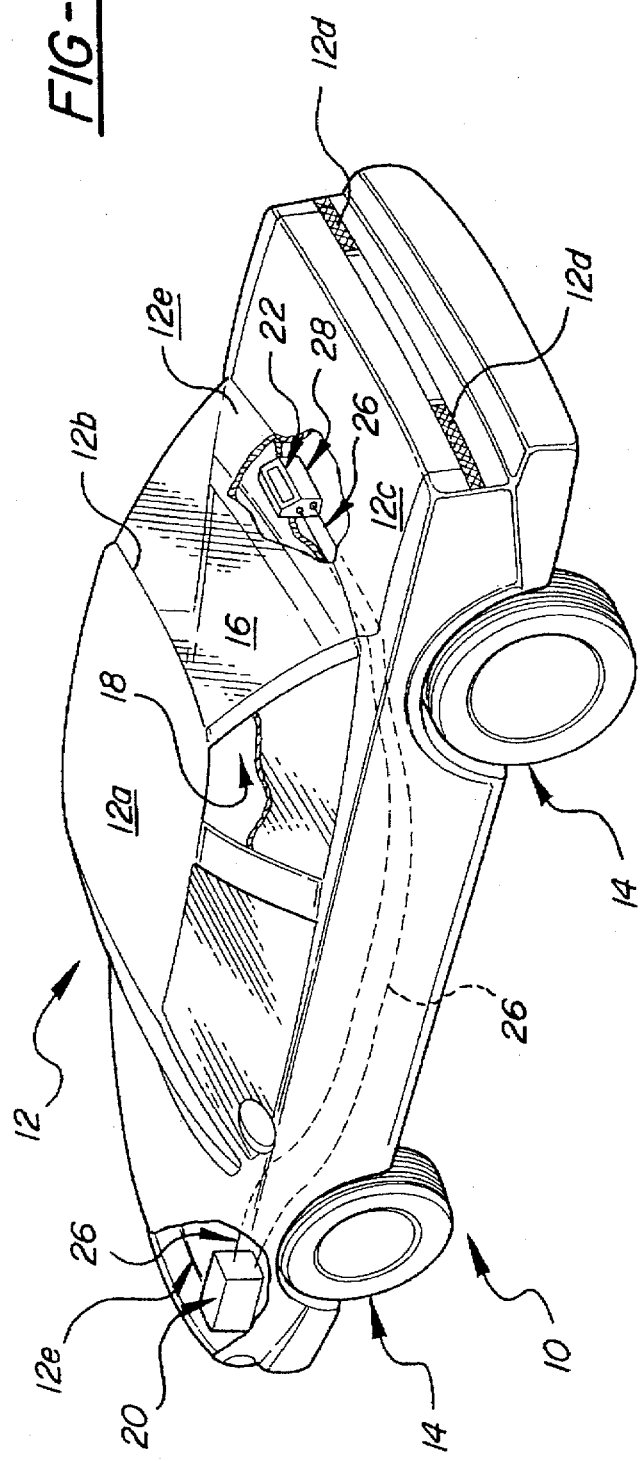
FIG. 1 is a perspective fragmentary view of a motor vehicle embodying the invention power supply.

The motor vehicle 10 as seen in FIG. 1 includes, in known manner, a body structure 12 and wheel assemblies 14.

Body structure 12 includes a greenhouse 12a defining a backlight opening 12b for receipt of a backlight 16; a deck lid 12c; taillights 12d; a passenger compartment 18 including a package shelf 12e; and an engine compartment 12f mounting a standard 12 volt DC storage battery 20 for use, in known manner, for starting the vehicle engine and otherwise powering the vehicle.

A center high mount stop light (CHMSL) 22 is positioned on package shelf 12e and, in accordance with Federal Regulations, is illuminated along with taillights 12d each time the vehicle brake is applied.

According to the invention, the light source for the CHMSL comprises a neon bulb 24 and the neon bulb is powered from the vehicle battery 20 via electric wires 26, a convertor 28 and electric connector means 30.

Convertor 28, broadly considered, includes an invertor 32 for receiving low voltage DC from the battery and converting the low voltage DC to a low voltage AC drive voltage; a transformer 34 including a primary 34a receiving the low voltage AC drive voltage from the invertor and a secondary 34b converting the low voltage AC drive voltage delivered to the primary to a high voltage AC; and a rectifier 36 receiving the high voltage AC from the transformer secondary and converting the high voltage AC to a high voltage DC for delivery to the neon bulb 24 via wires 30.

Convertor 28 further includes a convertor input 28a receiving wires 26 from the battery 20 and a convertor output 28b for connection to connector means 30.

Invertor 32 includes a resistor 38, transistors 40 and 42, a capacitor 44, and an inductor 46. Resistor 38 provides start up bias current for the transistors 40 and 42. Transistors 40 and 42, in combination with the transformer 34, define a self-oscillating type of circuit commonly known as a Royer Oscillator which functions to provide the AC drive voltage at the primary of the transformer. Capacitor 44, which is connected across the transformer primary, resonates the transformer to approximately 30 kHz and provides a somewhat sinusoidal waveform to the primary current to improve efficiency and reduce EMI generation. Inductor 46 sets the primary drive level or current and establishes the maximum output power.

Transformer 34 functions in known manner to step up the low voltage AC drive voltage received at the transformer primary 34a from the invertor to a high voltage AC at the transformer secondary 34b. The high voltage AC generated at the transformer secondary is delivered to rectifier 36.

Rectifier 36 includes a capacitor 48 and diode rectifiers 50 and 52. Capacitor 48 functions to couple the high voltage AC from the transformer secondary into the diode rectifier circuit. Capacitor 48 also functions to series resonate the transformer secondary so as to provide a clean sine wave for low EMI and maximum power transfer. Capacitor 48 further functions to limit the lamp current and functions in this respect as a reactive balance. Capacitor 48 further provides the necessary DC isolation for the diode rectifiers 50 and 52.

Convertor 28 further includes a resistor 54 and a capacitor 56 positioned between invertor 36 and the convertor output 28b. Resistor 54 functions to alter the line load of the neon tube 24 sufficiently to prevent relaxation oscillation from occurring due to the negative resistance characteristic of all neon lamps. Capacitor 56 functions to filter the rectifier output to provide a clean DC voltage.

Convertor 28 includes further components positioned between the convertor input 28a and invertor 32 and functioning to protect the circuit from "load dump" transients and prevent line conducted EMI from radiating from the input power lines. A Zener diode 58 provides most of the load dump protection which can be as high as several hundred volts. The remaining transient is sensed by a transistor 60 and zener diode 62. If the transient exceeds 15 volts, this circuit will turn off a series switch transistor 64. Turning off of the transistor 64 literally turns off the supply voltage to the circuit for the duration of the load dump transient time. This transient time is typically 250 milliseconds. This action protects convertor 28 from generating excessive voltage and destroying the transformer due to arc over of its secondary winding. Operating transistor 64 in this ON/OFF mode, rather than a more common linear mode, allows use of a smaller transistor and elimination of a heat sink which would otherwise be required. Capacitors 66 and 68 are also provided to help reduce line conductive EMI. Resistors 70, 72 and 74 are included to provide biasing for transistor 60; an inductor 76 is included to provide EMI filtering; and a capacitor 78 is included to provide further EMI filtering.

Figure 2:
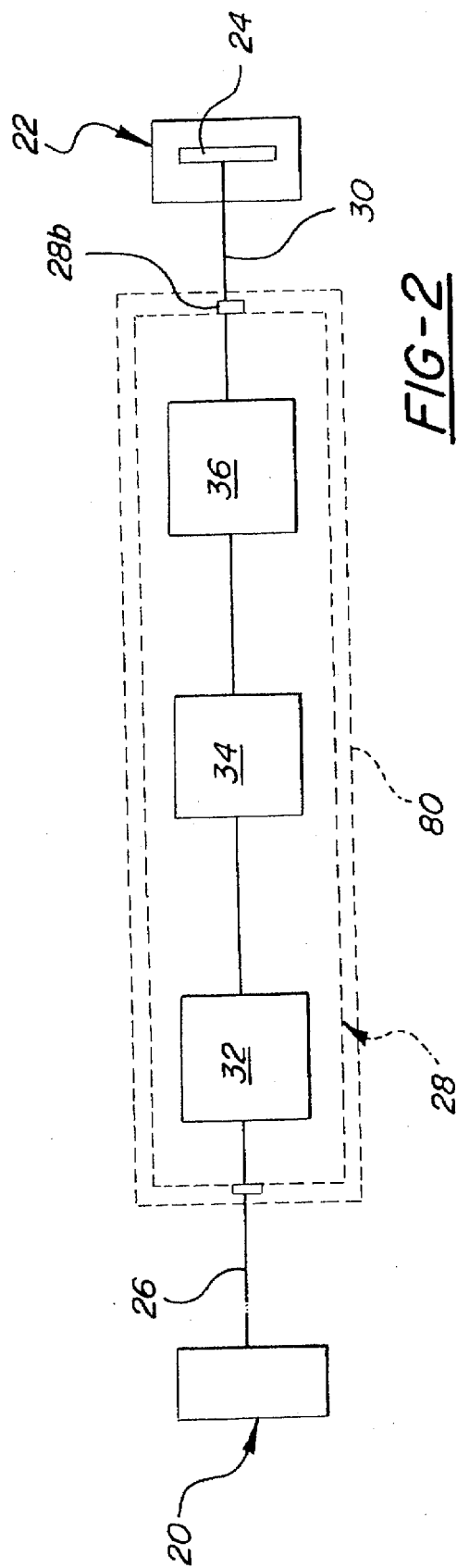
FIG. 2 is a diagrammatic view of the invention power supply.
Figure 3:
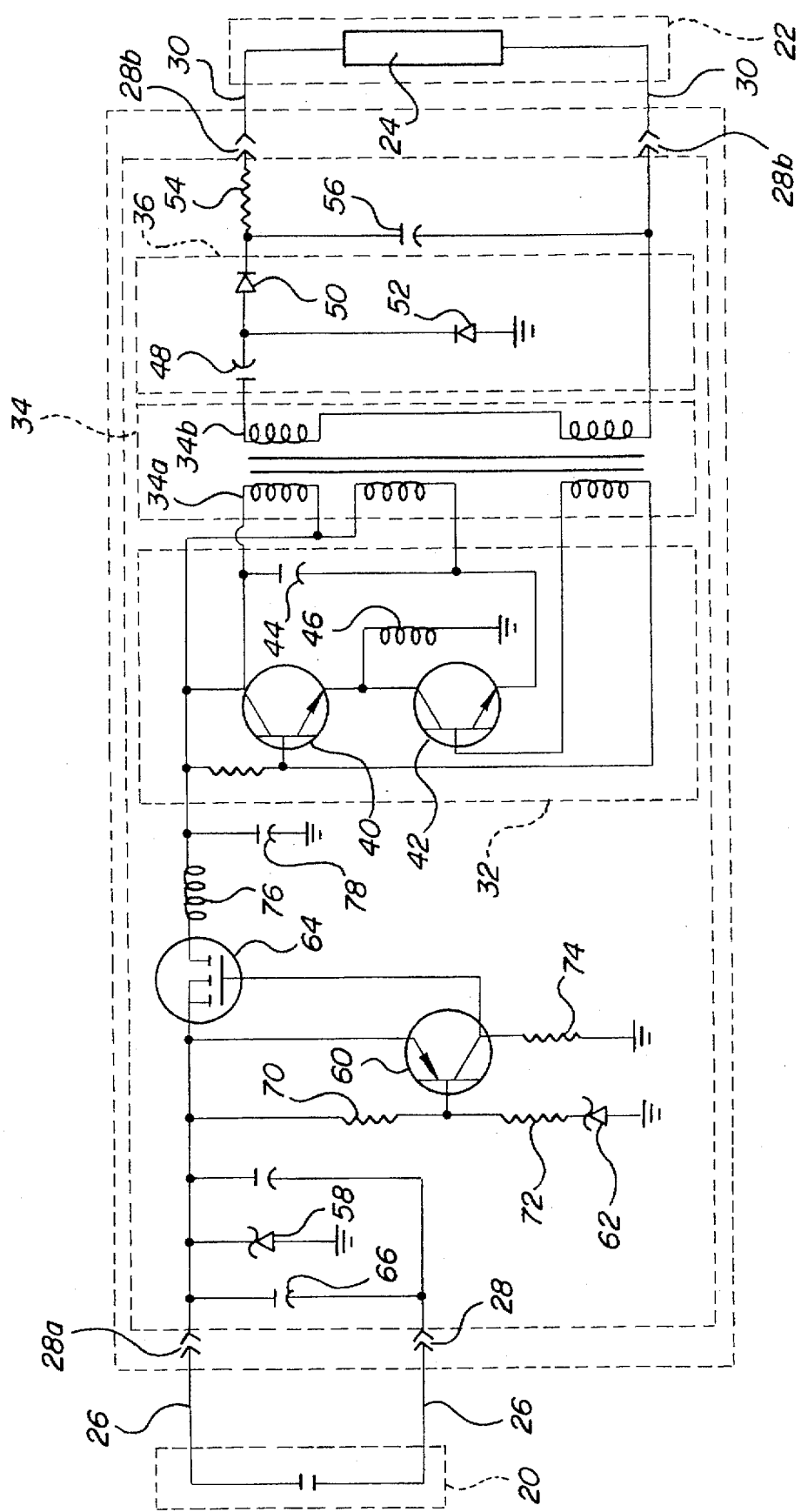
FIG. 3 is a schematic view of the invention power supply.

In the use of the invention power supply to provide power to the neon bulb 24 providing the light source for the CHMSL, convertor 28 may be positioned at any convenient point within the vehicle between battery 20 and CHMSL 22 but preferably, in order to minimize radiated RFI, should be closely adjacent or even, as shown, structurally integral with CHMSL 22 with the output of the convertor directly electrically connected to the input of the CHMSL. Once such a location has been determined, the convertor may be connected to the battery via suitably routed wires 26 and to the neon bulb 24 via connector means 30. As noted, the preferred location for the convertor is juxtaposed to the CHMSL in which event the connector wires 30 seen schematically in FIGS. 2 and 3 may be eliminated in favor of a direct electric connection between the convertor output and the CHMSL input. Convertor 28 also includes an EMI shield 80 to minimize electro magnetic interference with other electrical components on board the vehicle.

The voltage utilized in carrying out the invention will of course vary depending upon each individual application. However, in a typical application utilizing a 16" neon tube 24, the 12 volts DC provided by battery 20 is delivered via wires 26 to convertor 28; at invertor 32 the 12 volts DC is converted to 35 volts peak/peak AC; at the transformer 34 the 35 volts AC is stepped up to 3550 volts peak/peak AC; and at the rectifier 36 the 3550 volts AC is converted to 3550 volts DC for delivery to neon bulb 24.

This 3350 voltage is an ignition voltage and of course only lasts for a few milliseconds. Once the neon lamp has ignited and reached full illumination a load is created in the circuit and the circuit voltage drops to 540 volts DC. The 540 volts DC is an operating or load voltage reflecting the power in the system after the neon bulb has been ignited and reaches full illumination. These voltage figures are of course approximations and will vary considerably in actual practice.

The invention power supply will be seen to provide many important advantages. For example, since the neon bulb is being powered by a DC voltage there is less need to shield the neon tube with respect to magnetic emissions with the result that there is less need to be concerned with the troublesome and complicated requirement of shielding the tube while still allowing the light from the tube to be seen. Further, since the power is being transmitted between the battery and the convertor and between the convertor and the neon bulb in DC form there are less parasitic losses along the wire runs irrespective of the length of the wire runs. The invention power supply thus preserves the styling and illumination time advantages of a neon light source while substantially eliminating both the EMI radiation problem and the parasitic loss problem.

Whereas a preferred embodiment of the invention has been illustrated and described in detail it will be apparent that various changes may be made in the disclosed embodiment without departing from the scope or spirit of the invention. For example, although the invention has been described in association with a neon bulb 24, it will be understood that the invention has applicability to any light source of the plasma discharge type such for example as a fluorescent tube or a high intensity discharge tube.

We claim:

1. A circuit for use in providing power to a plasma discharge light source positioned on a vehicle utilizing the vehicle DC battery as the power source while reducing RF interference with other onboard electrical equipment, the light source including an ignition voltage circuit to fire the light source and a supply voltage circuit to operate the light source after the light source has been ignited and reaches full illumination, characterized in that:

the circuit includes a convertor operative to receive a low voltage DC from the battery, convert the low voltage DC to a high voltage DC, and deliver the high voltage DC to the supply voltage circuit of the plasma discharge light source to operate the light source after the light source has been ignited and reaches full illumination, the circuit thus functioning to power the light source with high supply voltage DC, whereby to minimize the need for shielding the light source with respect to RF interference.

2. A circuit according to claim 1 wherein the plasma discharge light source is positioned on the vehicle at a location remote from the battery, the convertor is positioned on the vehicle proximate the light source and remote from the battery, and the circuit includes line means for transmitting low voltage DC from the battery to the convertor so that the circuit functions to transmit only DC power over the line means so as to minimize parasitic line losses.

3. A circuit for use in providing power to a plasma discharge light source positioned on a vehicle utilizing the vehicle DC battery as the power source while reducing RF interference with other onboard electrical equipment, characterized in that:

the circuit includes a convertor operative to receive a low voltage DC from the battery, convert the low voltage DC to a high voltage DC, and deliver the high voltage DC to the plasma discharge light source, the circuit thus functioning to power the light source with high voltage DC, whereby to minimize the need for shielding the lamp with respect to RF interference; and the convertor includes
  a step up transformer having a low voltage primary and a high voltage secondary,
  inverter means receiving low voltage DC from the battery, converting the low voltage DC to a low voltage AC drive voltage, and delivering the AC drive voltage to the transformer primary for conversion to a high voltage AC at the transformer secondary, and
  rectifier means receiving the high voltage DC from the transformer secondary, converting the high voltage AC to high voltage DC, and delivering the high voltage DC to the plasma discharge light source.

4. Circuitry for use in providing high voltage supply voltage power to a plasma discharge light source positioned on a vehicle utilizing the vehicle DC battery as the power source while reducing the RF interference with other onboard electrical equipment, the circuitry including:

a convertor having an input and an output and operative to convert low voltage DC received at the convertor input to a high voltage DC at the convertor output;

line means electrically connecting the input of the convertor to the battery;

means defining an ignition voltage circuit for the light source and a supply voltage circuit for the light source; and means operative to deliver a high voltage DC from the output of the convertor to the supply voltage circuit;

the circuitry functioning to provide high voltage DC supply voltage to the light source, whereby to minimize the need for shielding the light source with respect to RF interference, the circuitry further functioning to transmit only DC power over the line means, whereby to minimize parasitic line losses in the circuit.

5. A circuit according to claim 4 wherein the plasma discharge light source is positioned proximate the rear of the vehicle, the battery is positioned proximate the front of the vehicle, and the convertor is positioned proximate the light source so that the line means extends lengthwise of the vehicle to interconnect the battery and the convertor.

6. A circuit for use in providing high voltage power to a plasma discharge light source positioned on a vehicle utilizing the vehicle DC battery as the power source while reducing the RF interference with other onboard electrical equipment, the circuit including:

a convertor having an input and an output and operative to convert low voltage DC received at the convertor input to a high voltage DC at the convertor output;

line means electrically connecting the input of the convertor to the battery; and means electrically connecting the output of the convertor to the plasma discharge light source;

the convertor including:
  a step up transformer having a low voltage primary and a high voltage secondary;
  invertor means receiving low voltage DC from the convertor input, converting the low voltage DC to a low voltage AC drive voltage, and delivering the AC drive voltage to the transformer primary for conversion to a high voltage AC at the transformer secondary; and
  rectifier means receiving the high voltage AC from the transformer secondary, converting the high voltage AC to a high voltage DC, and delivering the high voltage DC to the convertor output;

the circuit functioning to power the light source with high voltage DC, whereby to minimize the need for shielding the lamp with respect to RF interference, the circuit further functioning to transmit only DC power over the line means, whereby to minimize parasitic line losses in the circuit.

7. A method of providing power to a plasma discharge light source positioned on a vehicle utilizing the vehicle DC battery as the power source while reducing RF interference with other onboard electrical equipment, the plasma discharge light source including an ignition voltage circuit to fire the light source and a supply voltage circuit to operate the light source after the light source has been ignited and reaches full illumination, the method comprising:

transferring a low voltage DC from the battery over a line, receiving the low voltage DC transferred over the line from the battery, converting the low voltage DC to a high voltage DC, and delivering the high voltage DC to the supply voltage circuit of the plasma discharge light source, the high voltage DC delivered to the supply voltage circuit of the light source minimizing the required RF shielding with respect to the light source, the transfer of low voltage DC on the line minimizing parasitic line losses.

8. A method according to claim 7 wherein the plasma discharge light source comprises a neon bulb.

9. A method of providing power to a plasma discharge light source positioned on a vehicle utilizing the vehicle DC battery at the power source while reducing RF interference with other onboard electrical equipment, the method comprising:

delivering a low voltage DC from the battery to an invertor over a line, whereby to minimize parasitic line losses;

converting the low voltage DC at the invertor to a low voltage AC;

delivering the low voltage AC from the invertor to the primary of a transformer;

converting the low voltage AC at the transformer primary to a high voltage AC at the transformer secondary;

delivering the high voltage AC from the transformer secondary to a rectifier;

converting the high voltage AC at the rectifier to a high voltage DC; and delivering the high voltage DC from the rectifier to the plasma discharge light source so that the light source is powered by high voltage DC to minimize the RF shielding requirements with respect to the light source.

10. A method of providing power to a plasma discharge light source positioned on a vehicle having a DC battery while reducing RF interference with other onboard electrical equipment, the plasma discharge light source including an ignition voltage circuit to fire the light source and a supply voltage circuit to operate the light source after the light source has been ignited and achieves full illumination, the method comprising:

providing a convertor having an input and an output and operative to convert low voltage DC received at the convertor input to high voltage DC at the convertor output;

positioning the convertor on the vehicle at a location remote from the battery and proximate the light source;

electrically connecting the input of the convertor to the vehicle battery via a line; and electrically connecting the output of the convertor to the supply voltage circuit of the plasma discharge light source, whereby to power the light source with high voltage DC to minimize RF shielding requirements with respect to the light source and whereby to transmit low voltage DC over the line to minimize parasitic losses on the line.

11. A method according to claim 10 wherein the method includes the further step of shielding the convertor to further reduce electro magnetic emissions from the convertor and thereby reduce electro magnetic interference with other electric components on the vehicle.

12. A method according to claim 10 wherein the plasma discharge light source comprises a neon bulb.

* * * * *